(12) United States Patent
Beaver

(10) Patent No.: US 6,536,377 B2
(45) Date of Patent: Mar. 25, 2003

(54) EQUINE INVERTED POSTURE ALARM

(76) Inventor: Dennis Donald Beaver, 44526 N. 14 St., Phoenix, AZ (US) 85087

( * ) Notice: Subject to any disclaimer, the term of this patent is extended or adjusted under 35 U.S.C. 154(b) by 0 days.

(21) Appl. No.: 09/766,240

(22) Filed: Jan. 16, 2001

(65) Prior Publication Data

US 2002/0092480 A1 Jul. 18, 2002

(51) Int. Cl.$^7$ .................. A01K 29/00; G08B 23/00
(52) U.S. Cl. ................. 119/859; 119/719; 119/174; 119/908; 340/573.2; 340/573.3
(58) Field of Search ............... 119/859, 719, 119/720, 721, 174, 908; 340/573.1, 573.2, 573.3

(56) References Cited

U.S. PATENT DOCUMENTS

| | | | | | |
|---|---|---|---|---|---|
| 4,617,525 A | * | 10/1986 | Lloyd | ...................... | 340/573 |
| 4,730,625 A | * | 3/1988 | Fraser et al. | ................. | 128/781 |
| 4,830,021 A | * | 5/1989 | Thornton | ...................... | 128/707 |
| 4,914,423 A | * | 4/1990 | Fernandez | ................... | 340/573 |
| 4,972,177 A | * | 11/1990 | Nolan | .......................... | 340/573 |
| 5,081,447 A | * | 1/1992 | Echols | ......................... | 340/573 |
| 5,125,412 A | * | 6/1992 | Thornton | ...................... | 128/670 |
| 5,469,861 A | * | 11/1995 | Piscopo et al. | .............. | 128/781 |
| 5,643,329 A | * | 7/1997 | Solomonow et al. | .......... | 607/43 |
| 5,774,055 A | * | 6/1998 | Pomerantz | ................... | 340/573 |
| 5,796,340 A | * | 8/1998 | Miller | .......................... | 340/573 |
| 5,914,660 A | * | 6/1999 | Mesibov et al. | ............. | 340/517 |

* cited by examiner

Primary Examiner—Yvonne Abbott

(57) ABSTRACT

A system for detecting the relative inverted posture of an equine specimen. When such a posture, or positional attitude, of an equine specimen is greater than 90 degrees but less than 270 degrees as measured with respect to the rotation of the animal's body around the lateral axis—anterior to posterior—whereby the normal standing position of the animal is zero degrees, then a sensing switch will activate and transmit a corresponding radio frequency signal to a receiver at a remote location and sound an alarm to alert monitoring personnel.

1 Claim, 13 Drawing Sheets

EQUINE INVERTED POSTURE ALARM

BACKGROUND OF THE INVENTION

1. Field of the Invention

This invention relates generally to posture position monitoring and wireless alarm detection system for use on the equine specimen.

2. Description of the Related Art

Mesibov et al, U.S. Pat. No. 5,914,660, claims an apparatus of position monitor and alarm comprising a source of infrared radiated signal directed to a radiation-sensitive patch affixed to an infantes garment The state of the infrared reflected signal is then transmitted by wireless means to alert a care-giver if said infant assumes a predetermined position. While the basic philosophy and physics of transmitting the signal of intelligence from Point B (crib-side) to Point C (care-giver) by a wireless method may be somewhat similar in scope to this invention, the utility of sensing the datum at Point A (human or equine) is not. The utilization of an infrared patch source would only be practical in a close and controlled indoor environment. Conversely, it is the intent of the present invention to be utility feasible and economical for monitoring the inverted posture of the equine specimen that might be roaming in a 20-acre paddock. The infrared patch signal source as it relates to the utility of monitoring the equine specimen in a large paddock environment would not be feasible: The line-of-sight requirement for the proper operation of the infrared apparatus might be obstructed by a fence post, forage, building, or even rain, hence, potentially assuming a state exactly opposite of the actual posture state of the equine specimen.

Nolan, U.S. Pat. No. 4,972,177, discloses a remote transmitter/receiver alarm fixture to detect a human's upright position. His preferred embodiment implements the use of a ". . . multiplicity (preferably four or more) of switch means . . . physically arranged in the fixture . . . so that they are more-or-less evenly spaced about the circumference of the body when the fixture is worn." This fixture would not be practical for utility on the equine specimen as by nature the equine has tendencies in its normal daily routine to rub against natural and boundary objects which would render some of the "evenly spaced" switches and/or associated wiring inoperative. Additionally, the potential is high for damaging the switches during the normal process of the equine specimen assuming the lying (resting) position. Echols', Keep Off Your Back Alarm, U.S. Pat. No. 5,081,447, utilizes a somewhat similar sensing concept of this invention, but the invention falls short for use on the equine specimen: The signal sensing switches of his invention, FIG. 9, are merely attached to his harness apparatus with Velcro, and are located in a precarious and unprotected physical position; ". . . to be attached to the body at spaced locations, with one switch means being on the right and the other on the left frontal body region." The locations of the switch means on his human chest embodiment, if they would remain in place, can be expected to cause a chaffing or galling nuisance factor when adapting to the equine specimen. Furthermore, by the mere natural and unpredictable behavior of the equine specimen, particularly in an uncontrolled pasture environment, the proximity and integrity of the unprotected switch means may readily become eschewed or disabled when adapting for installation on the equine specimen.

Another of Echol's preferred forms ". . . employs a sensor apparatus in the form of a pair of series connected gravity actuated switch means adapted to be attached in spaced relation on one's head . . . " Any apparatus attached to a horse's head is assuredly detrimental for the operational integrity as well as the life expectancy of the apparatus. Additionally, the equine specimen readily tosses its head at whim which would detect a false indication.

Lloyd's, U.S. Pat. No. 4,617,525, claims an apparatus that utilizes an unspecified harness. A harness fabricated of materials as it relates to a harness designed and employed specifically for utilization on the human specimen, may not be suitable or practical for extended use on the equine specimen. His sensing apparatus employs a gravitational switch that, according to FIG. 5, is actuated to the Normally Closed configuration for precisely 120 geometric degrees of rotation. That is in direct conflict to this invention which specifies +/- 90 degrees (totaling 180 geometric degrees of rotation in the Normally Closed configuration). 120 geometric degrees of difference between design of his invention and the present invention is extremely critical, as the sensing switch (120 degrees: 240 degrees/Normally Closed: Normally Open respectively) means of his apparatus of invention, adapted for use with the equine specimen, could send a false detect alarm signal when the horse was merely lying in a resting mode. If one chose to adapt Lloyd's apparatus of invention to the equine specimen by utilizing his sensing switch in the Normally Open position for a detect alarm signal of 240 degrees of geometric rotation, (e.g. rotating the housing of the sensing switch apparatus 180 degrees—'upside down') a requirement to alter the electrical circuit design would be forced to accommodate a constant power consumption mode in the non-detect configuration. Additionally, 120-degrees of geometric rotation-switch Normally Open in this condition—for the detect alarm position (+/−60 problematic posture alarm data, as many horses roll less drastically than others while attempting to self-correct a physical, internal abnormality.

Lloyd employs a piezo-electric buzzer within the signal sensor apparatus. Such a design subjected to the object of the equine specimen would cause the average horse to become startled and perhaps behave unpredictably when said buzzer activated.

Lloyd's signal-sensing housing apparatus contains an orifice, FIG. 3, which exposes the internal electronics to the exterior elements. The operational life of the internal electronic components would indeed be jeopardized when application is transferred to an exterior environment as is a requirement for this invention as it applies to the equine specimen in an outdoor pasture environment.

Lloyd illustrates, FIG. 4, a harness without specification. In order for lasting and substantive operation when installed on the equine specimen, the harness must be a highly integral component must be constructed of strong material for extremely high durability; be of specific width, utilizing properly sized and styled buckles for the maximum distribution of tension forces—so as not to 'cut' into flesh during extended wear, and, symmetrically balanced in order for the signal sensing apparatus to physically seek the lowest gravitational point of the harness in the enabled state. Lloyd states that the harness straps utilized in his invention, "can be fastened by Velcro adhesive means." Straps attached with Velcro would not remain installed around the mid section of the equine specimen during an inversion episode.

Lloyd's monitor apparatus, FIG. 7, does not contain the required components to alert a ranch manager at a remote location when the detect mode of the sensor is triggered.

Relating specifically to the time-lapse delay circuitry of Mr. Lloyd's "Sleep Posture Monitor" system, it's noted that his invention specifies a maximum allowed duration of interruption of one second. An allowable duration of interruption of one second is not practical for the equine specimen application experiencing a violent posture inversion episode, as the equine specimen in this situation will roll on its back, or partially roll on its back in an effort to correct the abnormality for time periods generally less than one second in duration. In the equine specimen situation the ranch manager would seldom be alerted by an adaptation of the sensor apparatus of Lloyd's invention.

Pomerantz, U.S. Pat. No. 5,774,055, claims a body position monitoring device that utilizes one of a four sensing switch means, FIGS. 9, 10, 11, 12. None of the switch means of his invention could be adapted for a precise 180-degrees (geometric rotation) of Normally Open enable mode with an accompanied 180-degrees (geometric rotation) range of Normally Closed detect mode, which is a requirement of this invention to properly and accurately sense a violent inversion episode of the equine specimen. Additionally, due to the physical nature of the spherical encasement of his mercurial gravitational switch means, which may operate grand within the scope of his invention, it is foreseeable that the equine's violent inversion maneuvers would subject the switch to uncontrolled centrifugal and inertia properties of physics that could potentially render this type of means fallible. Further, no claim is presented by Mr. Pomerantz for the adaptation of his invention with regard to the utilization of a harness apparatus, an integral component of the present invention.

Piscopo et al, U.S. Pat. No. 5,469,861, Fraser et al, U.S. Pat. No. 4,730,625, and Fernandez, U.S. Pat. No. 4,914,423, all invented items relating to posture monitors. All, however fell short of even remotely being adaptable for use on the equine specimen as an inverted posture detection device.

BRIEF SUMMARY OF THE INVENTION

Relating to equine, abnormal parturition during foaling is frequent, i.e., dystocia (fetal body parts maligned in birth canal), where fetus cannot be expelled without external assistance, or hypoxia (fetus starved of oxygen from various causes such as pinched umbilical cord; compressed arteries as the result of abnormal movements or restrictions during parturition; or, premature separation of placenta). In the frequent events of dystocia or, hypoxia, human intervention is crucial to preclude a catastrophic outcome. When an abnormal situation occurs, it is a common practice for the mare to roll and thrash as a natural method to self-correct the problem condition. Many times the mare's efforts to correct the condition without intervention is futile, and the fetus dies. This invention, consisting of a sensing switch contained within a wireless transmitter attached to a harness apparatus, installed on a horse, through the use of a system monitor would sound an alarm to alert personnel to intervene and prevent the aforementioned adverse outcome. It is also common practice for an equine animal to invert during the onset of colic (twisted or compacted intestine, blocked bile, or stomach disorder)—a many times fatal event. This invention is an alarm system comprised of three major components: an inverted posture sensor with housing, a harness to carry the wireless sensor/housing, and an alarm monitor that would alert monitoring personnel, and allow intervention to provide treatment, therefore preventing a fatality. The utility of this invention is to detect the inversion of an equine mammal that is exhibiting symptoms of abnormal parturition as well as the onset of colic, and alarm personnel to intervene.

BRIEF DESCRIPTION OF THE SEVERAL VIEWS OF THE DRAWINGS

FIG. 1 shows the mounting pilot holes (11), the on/off switch (12), the antenna (13), and the battery access door (14).

FIG. 2 shows the antenna (21), the gravity switch (22), the amplifier (23), the radio frequency transmitter (24), and the 9-volt battery (25).

FIG. 4 shows the electrical pickoff point (41), the ferrous mass (42), the circular coil of conductive wiring (43), the internal damping fluid (44), and a portion of the non-metallic enclosure (45).

FIG. 5 shows the harness strapping (51), the elastic strapping (52), the 2-nail buckle (53), the sensor mounting pad (54), and the optional breast belt strapping (55).

FIG. 8 shows the antenna (81), the power on/off switch (82), the press-to-start button (83), the power on light (84), the alarm detect light (85), the alarm-select switch (86) (light, or buzzer and light), and the mode select switch (87) (single or continuous alarm).

FIG. 9 shows the antenna (91), the radio frequency receiver (92), the signal amplifier (93), the 0.25 time-delay filter (94), the output relays (95), the power supply (96), the piezo alarm detect buzzer (97), and the alarm detect light (98).

DETAILED DESCRIPTION OF THE INVENTION

Figure 1:
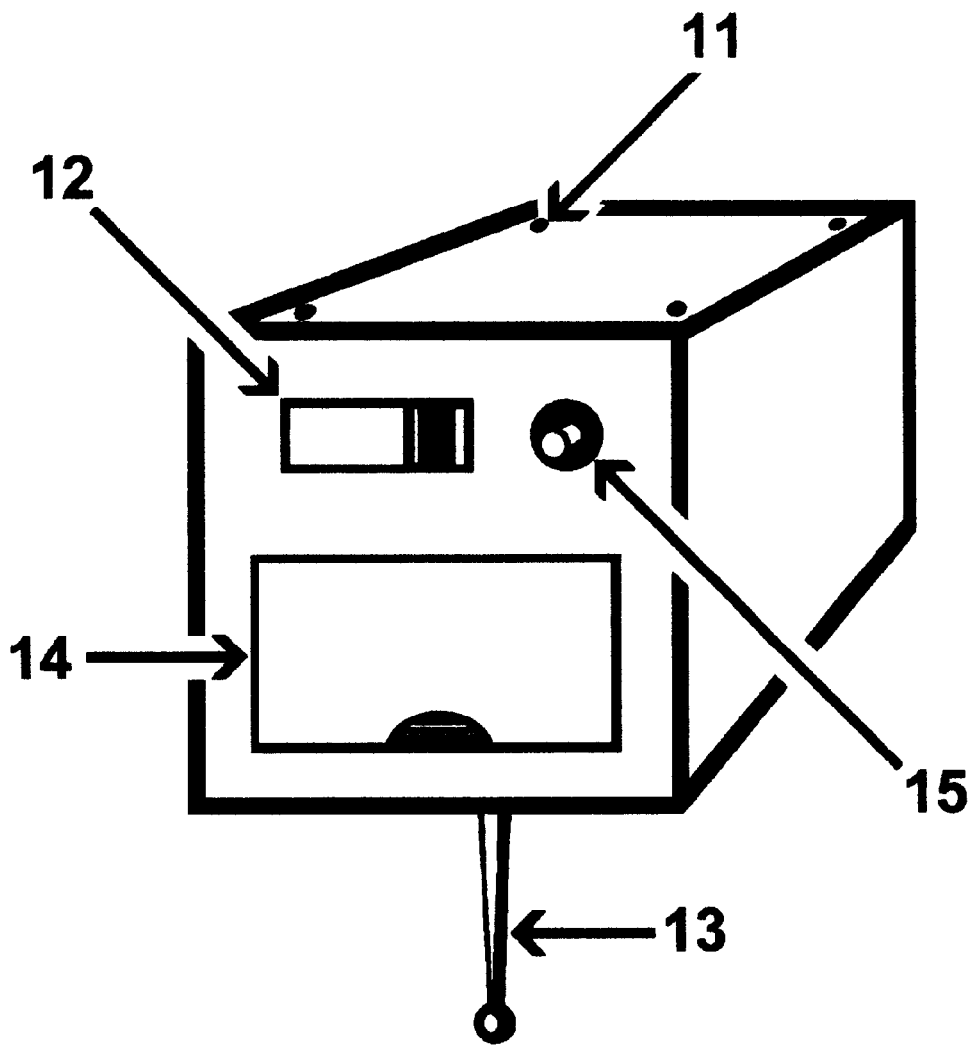
FIG. 1 shows a perspective of the preferred embodiment of the sensor housing.
Figure 2:
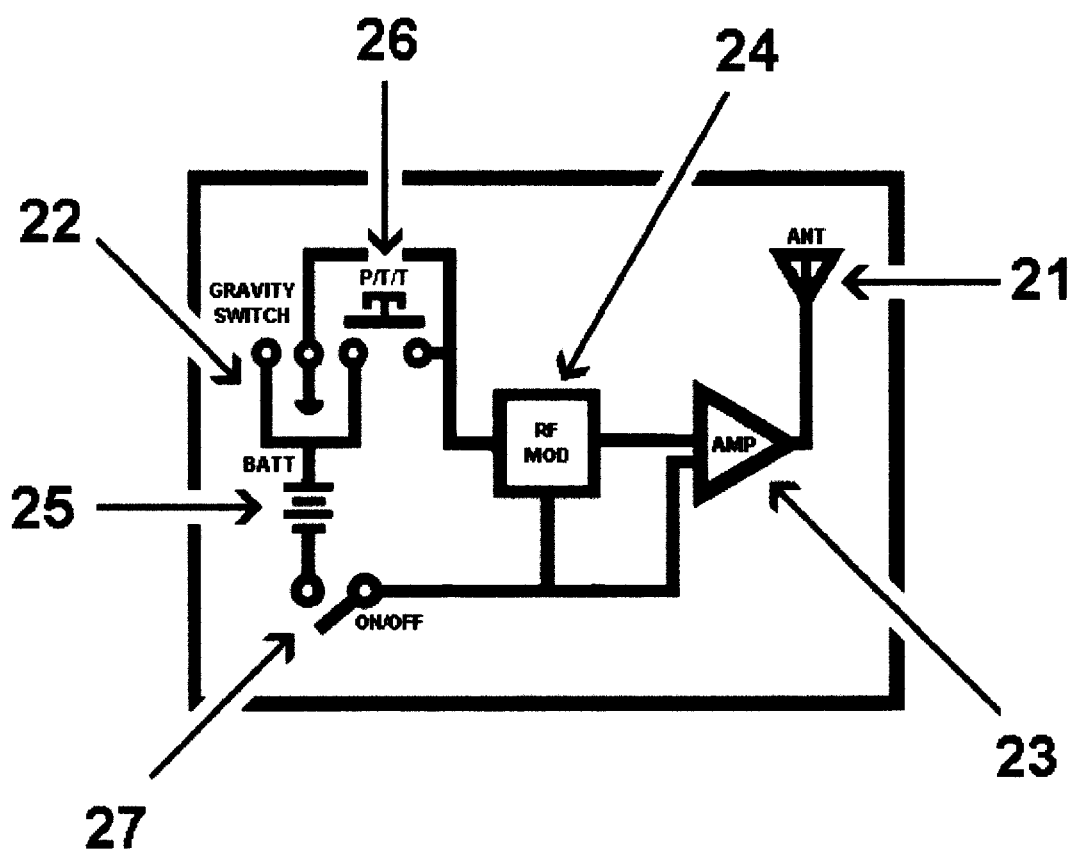
FIG. 2 is a block diagram of the electronics contained within the sensor housing.
Figure 3:
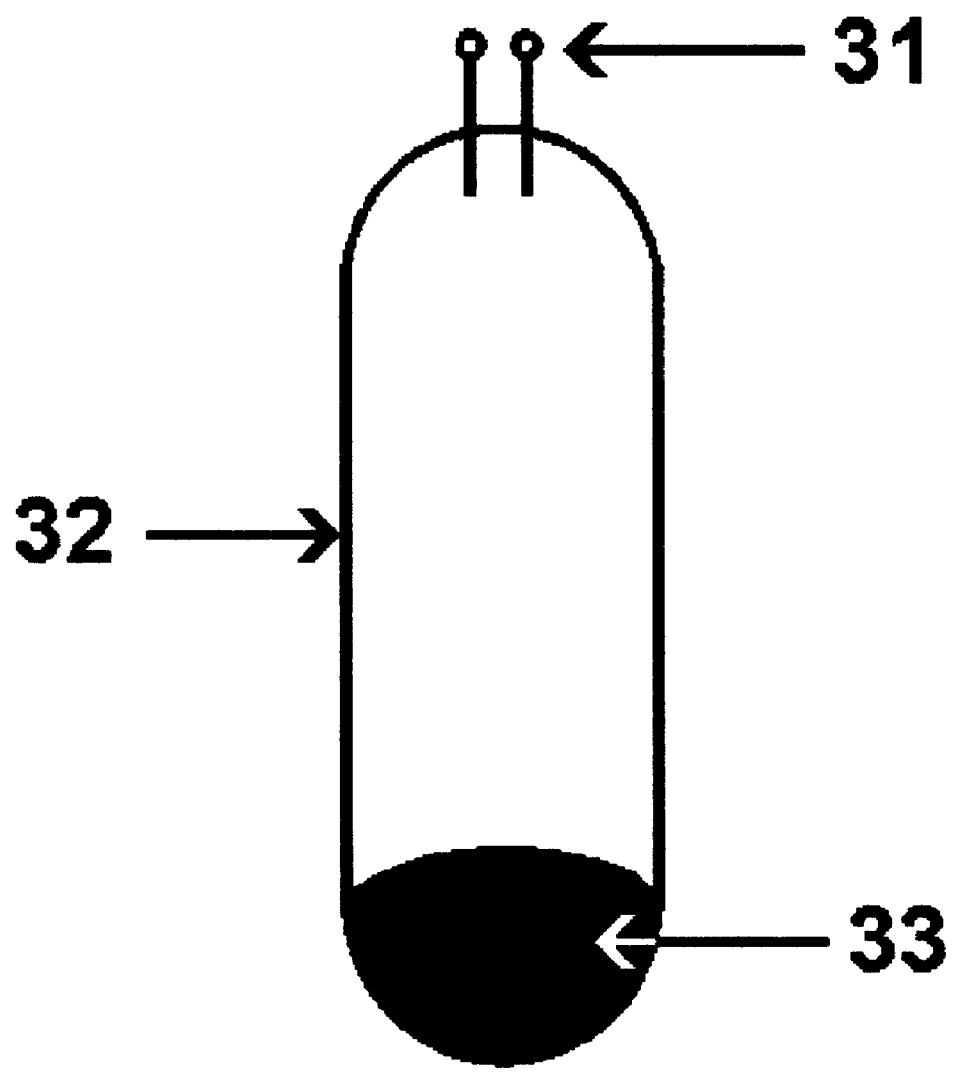
FIG. 3 shows the preferred embodiment of the 180-degree/180-degree, normally open/normally closed mercury gravity switch having two electrodes (31), and the cylindrical capsule encasement (32).
Figure 4:
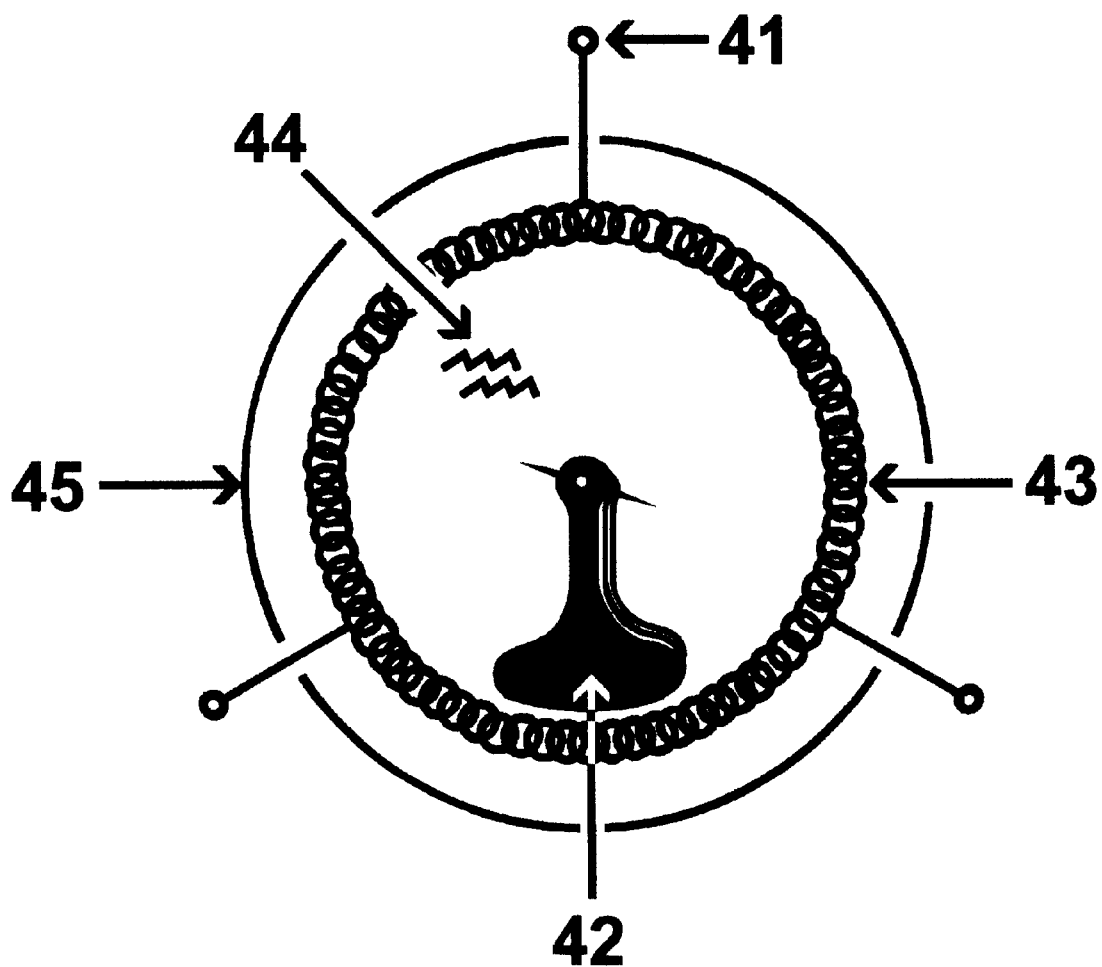
FIG. 4 shows a second embodiment of a gravitational switch means, the pendulum delta/e-core gravity/position switch.
Figure 5:
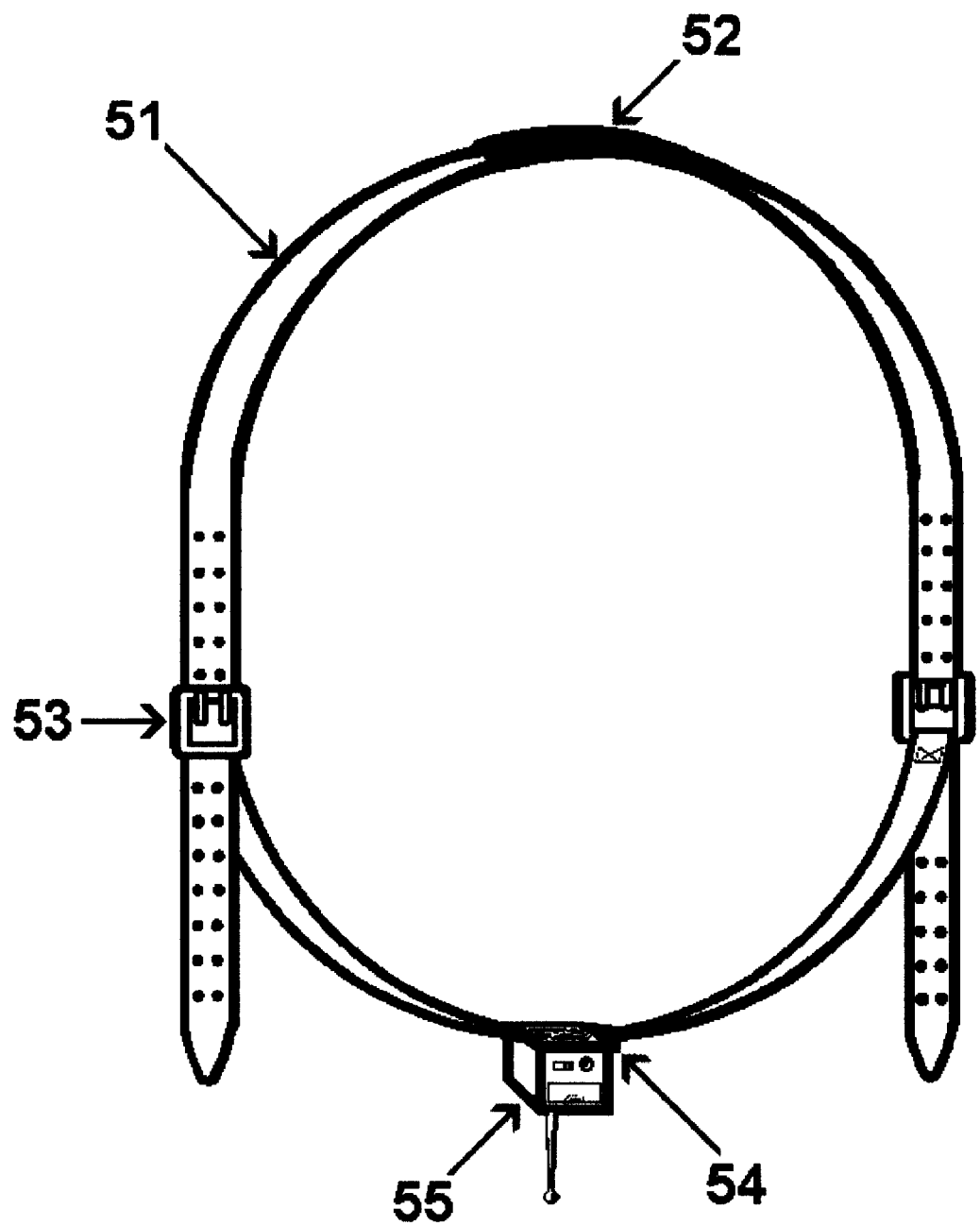
FIG. 5 shows a perspective of the harness apparatus complete with components.
Figure 6:
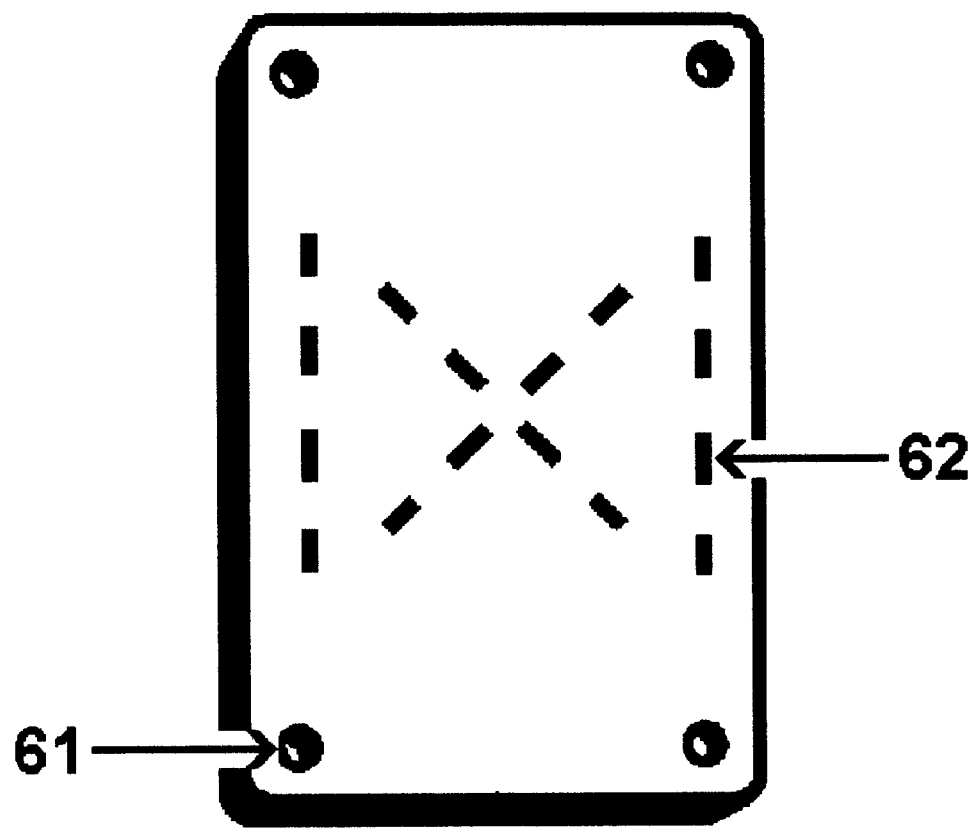
FIG. 6 is an illustration of the harness apparatus sensor mounting pad having pre-drilled screw holes (61) for mounting the sensor.
Figure 7:
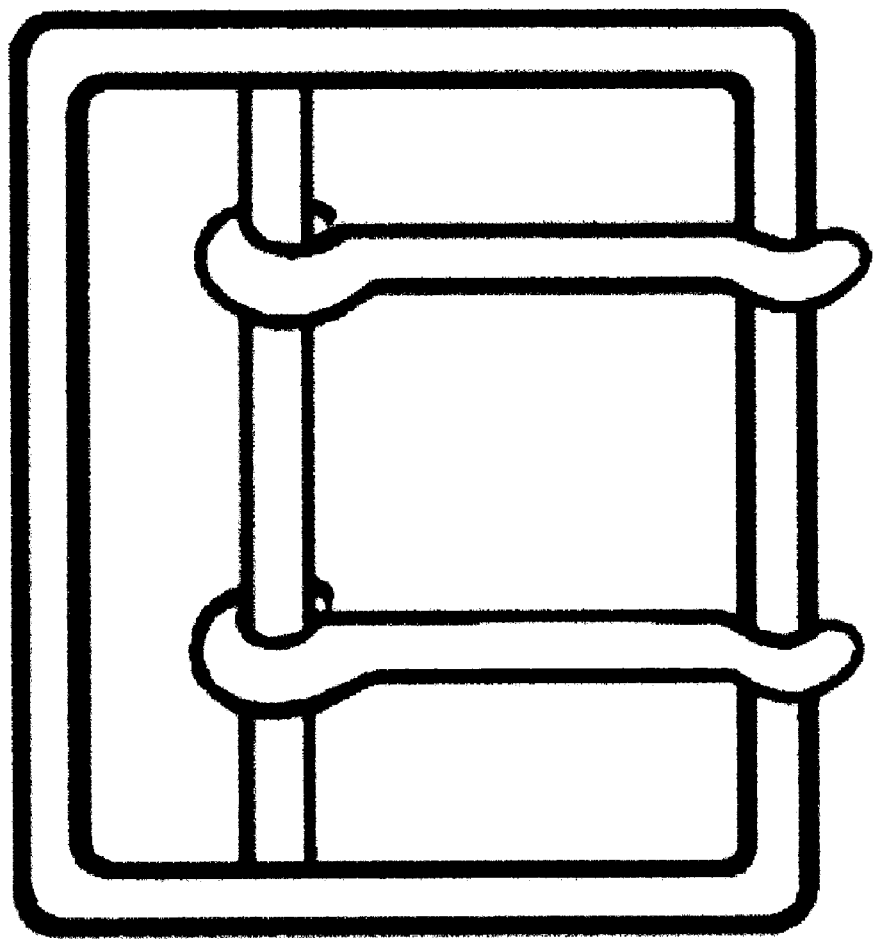
FIG. 7 shows the 2-nail buckle used throughout the harness apparatus.
Figure 8:
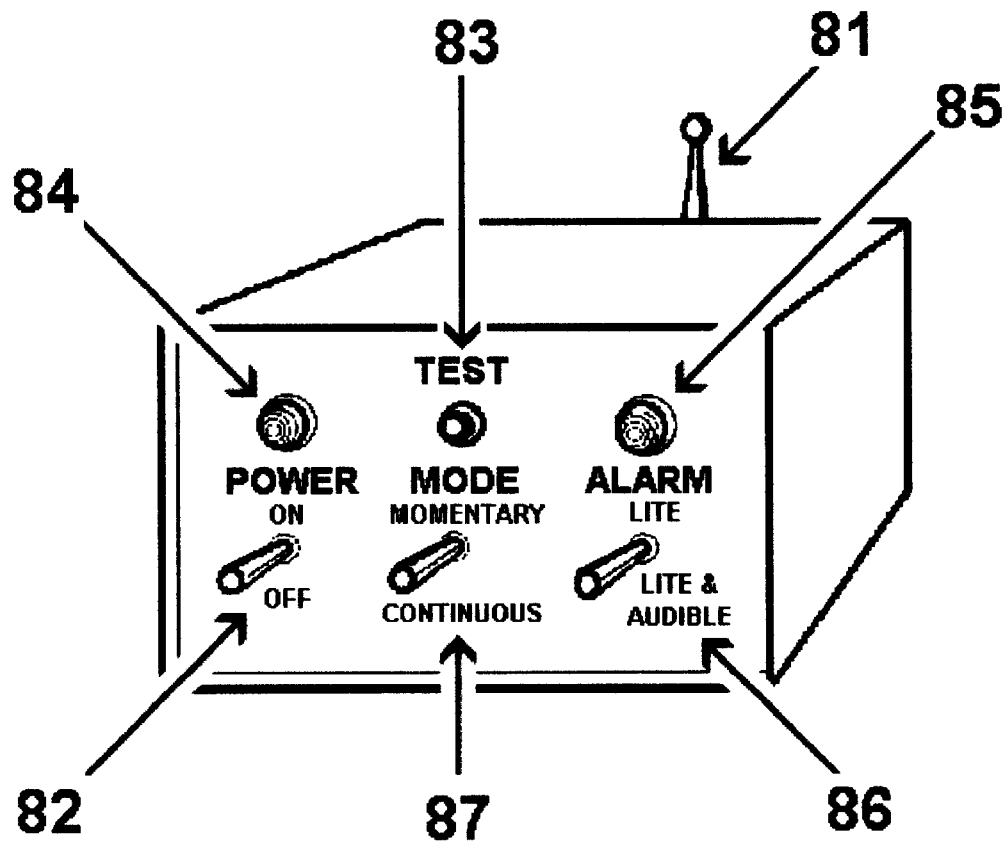
FIG. 8 shows a perspective of the preferred embodiment of the monitor housing.
Figure 9:
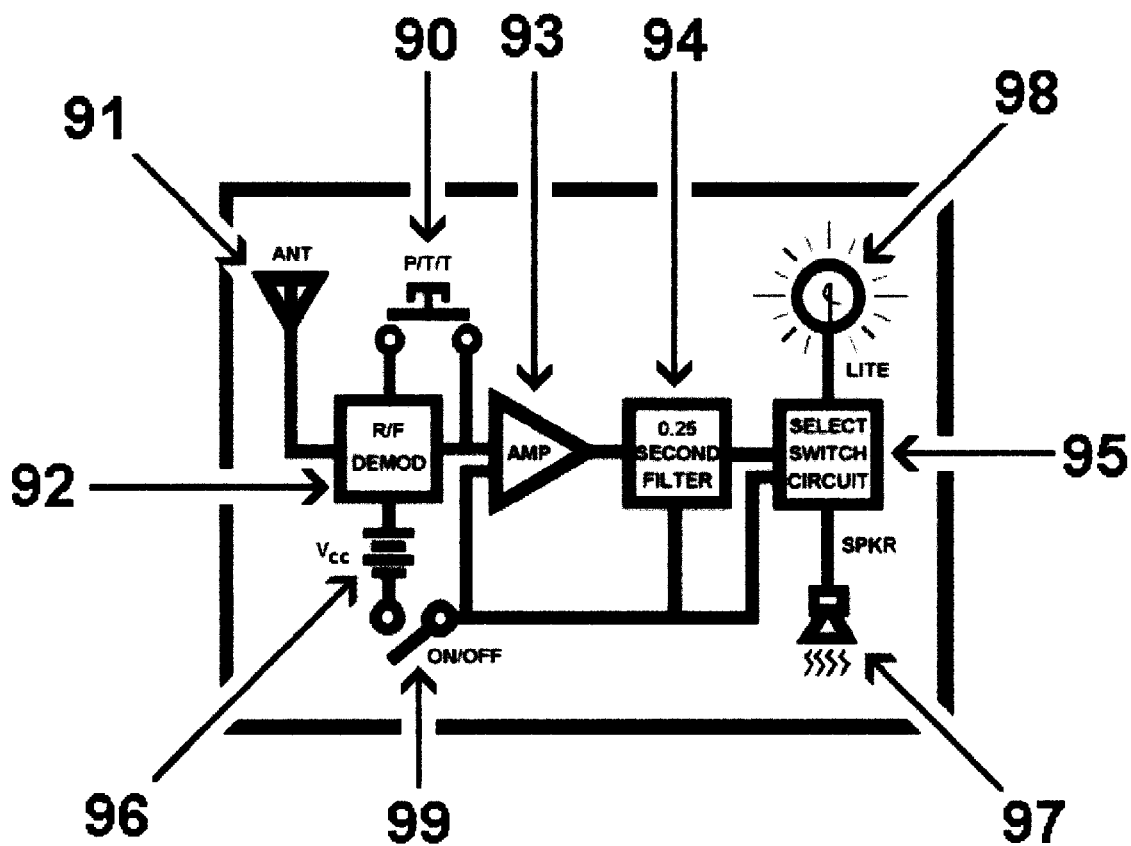
FIG. 9 is a block diagram of the electronics contained within the monitor housing.

This system of invention includes three major components: 1. Sensor-a sensing and transmitting device in the form of a weather- and impact-resistant housing (FIG. 1) of electronic components, including a power supply (battery), a gravitational switch (FIG. 3 FIG. 4), a radiofrequency transmitter (FIG. 2), a power amplifier, and an antenna (FIG. 2); 2. Harness—an apparatus of specific design (FIG. 5) to carry the sensor in a precise position on the horse without restricting respiration, without 'cutting' into the animal's flesh, and at the same time, maintaining proper position to allow the sensor to operate accurately; 3. Monitor—a receiving and monitoring device in the form of a housing (FIG. 8) of electronic components, including an antenna, a radio frequency receiver (frequency matched to the transmitter of the sensor), a power amplifier, manual and electronic switches, position lamps, alarm light and alarm audible device, and power supply (battery for portable model; transformer/rectifiers/capacitive filters and overload protector for the in-home model) (FIG. 9).

Figure 10:
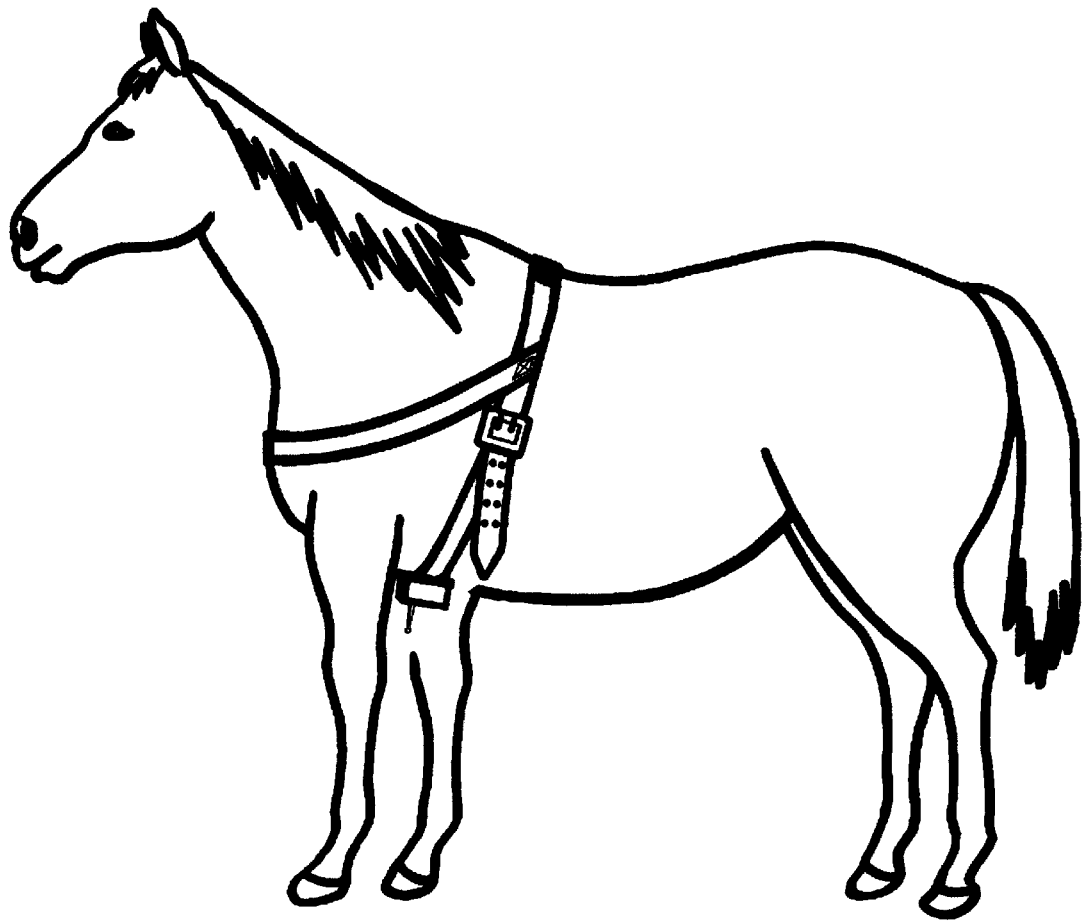
FIG. 10 is a profile illustration of the sensor and harness apparatus installed on the equine specimen.
Figure 11:
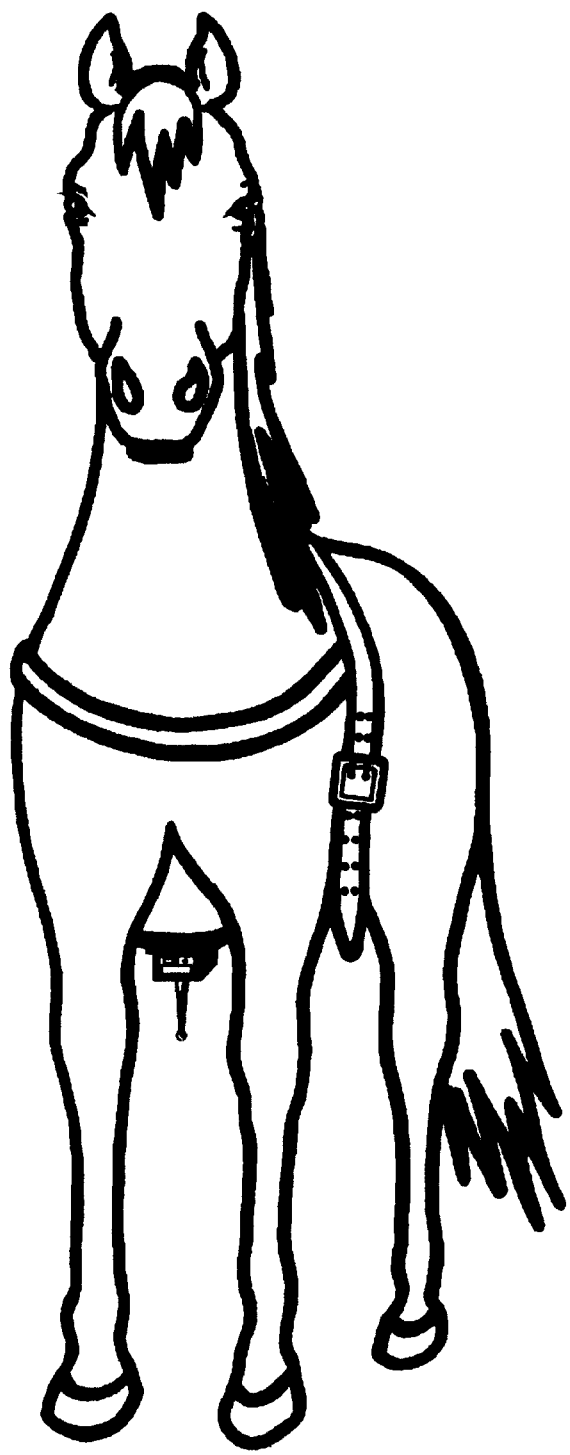
FIG. 11 is a frontal illustration of the sensor housing and harness apparatus installed on the equine specimen.

Said harness apparatus (FIG. 5), with sensor attached (FIG. 1), would be positioned around an equine specimen's mid-section—immediately aft of the animal's withers, upper, and immediately forward of the animal's belly, lower (FIG. 10). Said harness apparatus, when properly adjusted, will not restrict normal respiration, or 'cut' into the animal's flesh, and, coupled with the natural gravitational forces acting upon the suspended sensor and symmetrically placed harness adjustment buckles will maintain the sensor in its proper spatial position and alignment: 1. Positioned at the lowest point of the harness apparatus, and, 2. Aligned with the lateral axis of the animal (FIG. 11).

Figure 12:
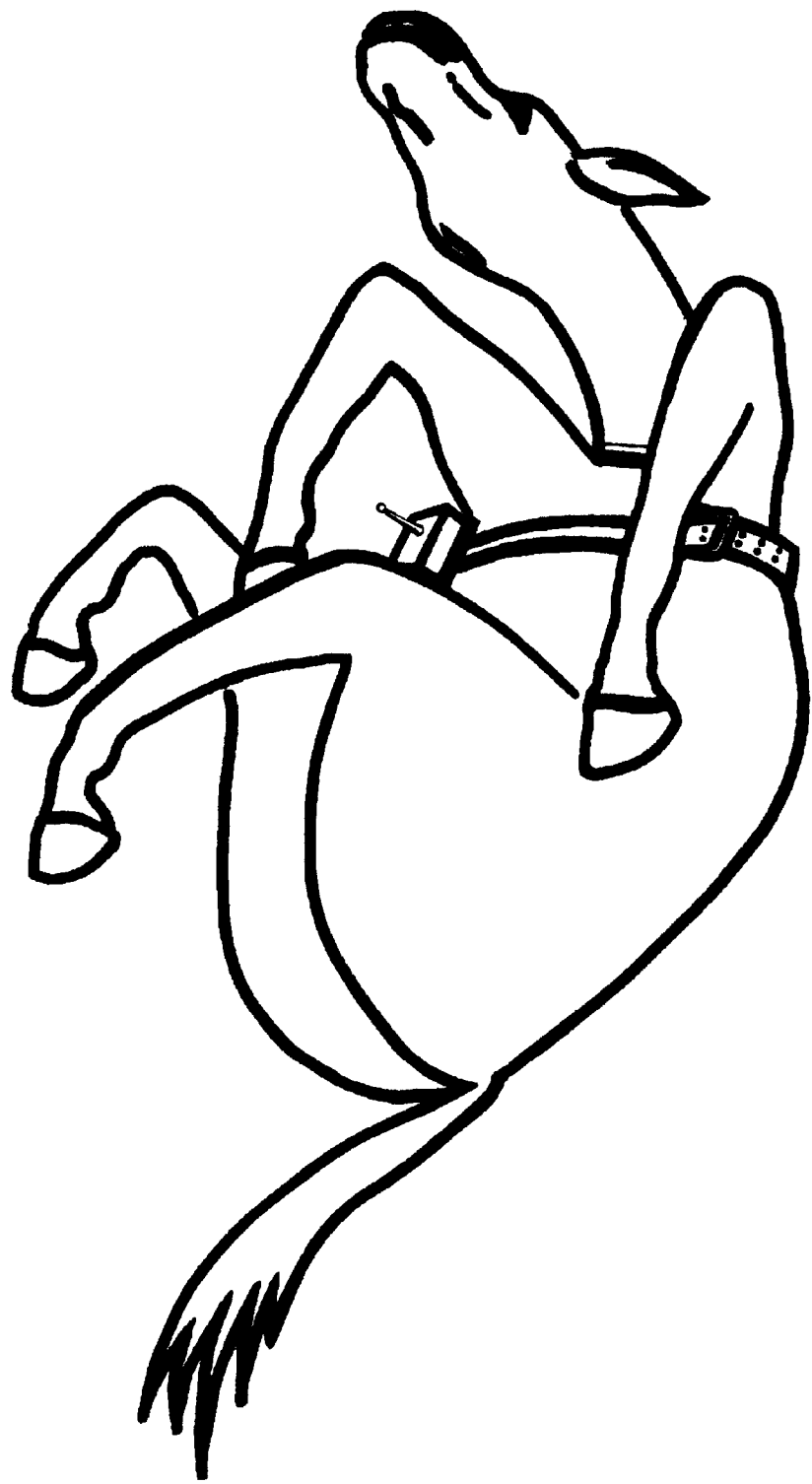
FIG. 12 is a rear illustration of the sensor housing and harness apparatus while donned on an equine specimen experiencing an inversion episode, the sensor enabled triggering the alarm detect mode.
Figure 13:
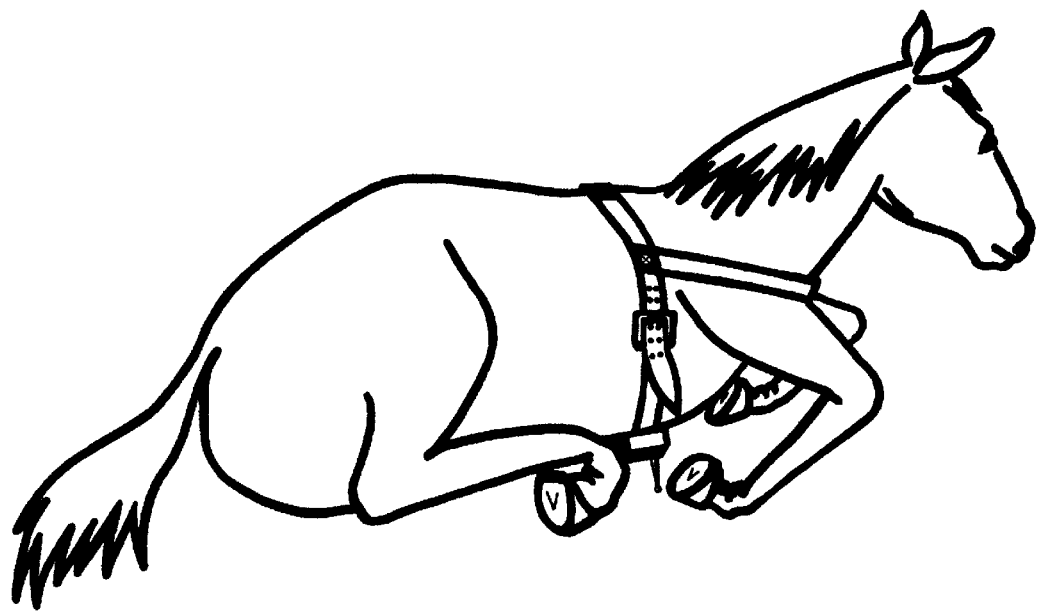
FIG. 13 illustrates an equine in a resting state, the sensor disabled.

When the animal lays and rolls—or, attempts to roll (FIG. 12)—the gravitational sensing switch within the sensor, closes and activates the operation of the radio-frequency transmitter, which wirelessly transmits the animal's inverted posture condition to a remote location limited in distance primarily by the power capacity of the transmitter circuitry which is regulated by the Federal Communications Commission. The signal-receiving device of the monitor must be RF frequency matched to the RF transmitter in the sensor. The design of the monitor utilizes a filtering device that inhibits spurious events from activating the alarm mode; events shorter in duration than 0.25 seconds, i.e., horse frolicking while running, or the jostling movements incurred many times during the simple process of lying in the resting position (FIG. 13). The design of the monitor of this invention (FIG. 9) provides for a single-event single-alarm mode, as well as a single-event continuous-alarm mode, e.g., alarm buzzer/light activates from a single event and remains activated until reset at the monitor, even though the animal has righted itself. This mode of operation is notably advantageous, particularly if monitoring personnel are asleep when the inversion episode occurs.

What is claimed is:

1. An equine inverted posture alarm (EIPA) system to alert personnel of a pregnant equine specimen experiencing symptom of an abnormal or difficult parturition, or an equine specimen experiencing painful colic symptoms as demonstrated in both situations by the equine specimen exhibiting violent thrashing and posture inversion, through the utilization of components comprising:

a) a sensor housing;

b) a radio frequency transmitter;

c) a posture position sensing gravitationally referenced switch comprising a longitudinal electronically insulated capsule, wherein the switch capsule assumes a normally closed detect enable state for 180 degrees in the rotary plane, and the longitudinal axis of the capsule is perpendicular to the earth's horizon when mounted within the sensor housing and installed on the harness of the equine specimen assuming a normal standing position;

d) a harness apparatus which is fitted around the girth of the equine specimen;

e) a radio frequency receiver;

f) an alarm detection monitor which responds to a signal from the radio frequency transmitter based on the change of gravity as sensed by the posture position sensing gravitationally referenced switch, wherein said alarm detection monitor includes a time delay circuit;

g) a monitor housing.

\* \* \* \* \*